United States Patent [19]

Kallinger et al.

[11] Patent Number: 4,696,135
[45] Date of Patent: Sep. 29, 1987

[54] METHOD AND APPARATUS FOR CONSTRUCTING TOWERS

[75] Inventors: Franz Kallinger, Greenwich, Conn.; Mark E. Killion, Paris, Ill.

[73] Assignee: Custodis-Cottrell, Inc., Branchburg, N.J.

[21] Appl. No.: 843,720

[22] Filed: Mar. 25, 1986

[51] Int. Cl.⁴ .............................................. B06C 23/62
[52] U.S. Cl. ....................................... 52/121; 52/115; 52/648; 249/20
[58] Field of Search .................. 52/743, 115, 121, 649, 52/648, 741, 749; 249/19, 20, 22; 91/515

[56] References Cited

U.S. PATENT DOCUMENTS

| | | |
|---|---|---|
| 1,631,848 | 6/1927 | Yager . |
| 2,675,211 | 4/1954 | Regoord ............................ 52/121 X |
| 2,763,339 | 9/1956 | Horth ..................................... 52/121 |
| 3,187,838 | 6/1965 | Stewart, Jr. et al. ................ 182/144 |
| 3,241,634 | 3/1966 | Prosser ................................ 182/144 |
| 3,807,120 | 4/1974 | Viandon .............................. 182/178 |
| 3,945,106 | 3/1976 | Mayr et al. ...................... 52/741 X |
| 3,958,376 | 5/1976 | Campbell ............................. 52/115 |
| 3,966,376 | 6/1976 | Heinzle ............................ 249/20 X |
| 3,967,699 | 7/1976 | Jasch ...................................... 187/2 |
| 4,058,184 | 11/1977 | Stuart et al. ........................ 182/128 |
| 4,060,358 | 11/1977 | Fougea ................................ 425/65 |
| 4,122,646 | 10/1978 | Sapp ..................................... 52/648 |
| 4,161,229 | 7/1979 | Mifsud ............................ 91/515 X |
| 4,166,603 | 9/1979 | Ward ..................................... 249/20 |
| 4,357,994 | 11/1982 | Hall ................................ 52/115 X |
| 4,381,636 | 5/1983 | Sapp ..................................... 52/648 |
| 4,468,904 | 9/1984 | O'Malley .............................. 52/111 |
| 4,562,989 | 1/1986 | Scheller .......................... 249/20 X |
| 4,590,720 | 5/1986 | Reed ..................................... 52/121 |

FOREIGN PATENT DOCUMENTS

| | | |
|---|---|---|
| 94297A | 11/1983 | European Pat. Off. . |
| 2406387 | 8/1975 | Fed. Rep. of Germany . |
| 588306 | 2/1959 | Italy . |
| 811075 | 10/1956 | United Kingdom . |
| 939688 | 7/1982 | U.S.S.R. . |
| 953149 | 8/1982 | U.S.S.R. . |

OTHER PUBLICATIONS

Photographs of a derrick believed to be in existence in the summer of 1984.

Primary Examiner—William F. Pate, III
Assistant Examiner—Creighton Smith
Attorney, Agent, or Firm—Christopher B. Garvey

[57] ABSTRACT

In the construction of tall concrete towers, a two part derrick is suspended by cables from the tower to the lower part of the derrick. The derrick is extended on hydraulic rams, raising its upper part and outside casting forms. A pulley system maintains a deck scaffold and inside forms at their original level during extension. Extension of the derrick slakens cables from the tower to the upper part of the derrick. These cables are disconnected from the tower and reconnected at a higher level. Outside forms are fixed, reinforcing steel set in place, and the derrick retracted, raising the deck scaffold and inside forms by the pulley system, and slacking the lower cables. The lower cables are disconnected from the tower and reconnected at a higher level. Inside forms are set and concrete is poured. The concrete sets and the procedure is repeated.

The deck scaffold comprises radiating wooden beams with endpieces. As tower diameter decreases due to taper at higher elevations, the endpieces are removed, the beams cut back, and the endpieces replaced on the new beam ends.

20 Claims, 37 Drawing Figures

FIG. 6
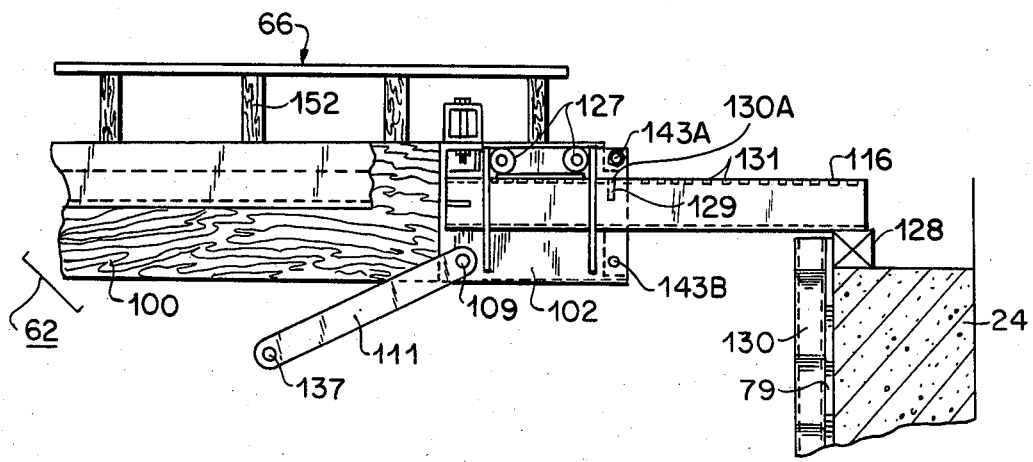
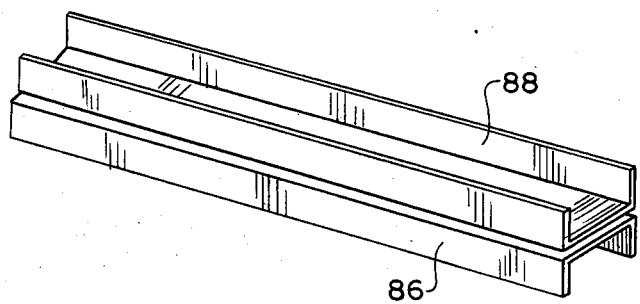
FIG. 7

METHOD AND APPARATUS FOR CONSTRUCTING TOWERS

BACKGROUND OF THE INVENTION

1. Field of Invention

The present invention relates to a method of constructing towers such as tall concrete chimneys or cooling towers and to an apparatus such as a derrick for use in such a method.

2. Description of the Prior Art

In the construction of tall concrete structures such as chimneys, cooling towers, and the like it has long been a practice to construct a derrick comprising one or more work decks from which the casting of concrete of the tower is done. Stirrups are conventionally cast into each level of the concrete tower as anchor points. As the concrete hardens, cables are attached to these stirrups and the derrick is supported by these cables on the stirrups. As the tower is built higher, the derrick is raised to be supported by stirrups at higher levels. The stirrups being used at any given time are those mounted at a level below that which is being poured.

Derricks of this type have been constructed of wood for more than 30 years. An improved alloy structure for such derrick was disclosed in U.S. Pat. No. 4,122,646 issued to Sapp in 1978.

Typically, in the use of such derricks, a work day begins with the derrick supported by cables anchored to a level of the tower poured three days before. There may be about 12 such cables, running from anchor points on the tower, under the derrick where they are attached at 24 points to the derrick, and where they form a basket-like cradle for the derrick, to 24 anchor points on the opposite side of the tower. About 12 cables are connected by chain blocks to an angle ring braced against the outside forms of the tower. A large crew of men then jacks up the derrick by tightening the chain blocks on each of the 12 cables, taking care to tighten each block evenly with the others so as to keep the derrick supported in a level attitude. When workers tighten these block unevenly, they generate large internal stresses in the derrick, which stresses are particularly hard on a wooden derrick, and which may deform the angle ring.

The outer forms which were used to cast the previous day's pour are then attached to chain-hoists mounted on upper outriggers on the derrick. The forms are broken loose and hoisted by the chain-hoists to the next level and secured in place. Reinforcing steel, including anchoring stirrups, is placed inside the outer forms. A work scaffold, comprised of a plurality of parallel beams, is then raised by chain hoists. Inner forms are broken loose and hoisted by chain hoists, then placed inside the reinforcing steel. Concrete is then poured from the derrick, between the outer and inner forms, encapsulating the reinforcing steel within. The concrete hardens overnight and the procedure is repeated again next day at a new level.

SUMMARY OF THE INVENTION

In the present invention a vertically expanding derrick is used to combine several of these steps together.

The expanding derrick comprises two parts: an upper part and a lower part. The two parts are joined together by hydraulic cylindrical rams and by slidable reinforcing means. In order to lift the upper part, the lower part is suspended taughtly by cables strung from the lower part to the tower, and the derrick is extended upon the hydraulic rams; rather than being conventionally lifted by a large crew of men with cable jacks who must carefully tighten each cable evenly to keep the derrick at a level attitude. The outside casting forms are raised together with the upper part of the derrick, rather than raising each form individually as a separate step.

When the upper part of the derrick with the outside forms is raised, it is desirable to still maintain the work deck at the height of the top of the previous day's pour. For this purpose an ingenious pulley post system has been devised to allow the deck to fall relative to the upper derrick at the same rate at which the upper derrick rises, thus keeping the deck stationary relative to the tower.

Because the upper derrick has now been raised, it is no longer supported by upper cables attached to the tower, which have become slack during the raising of the upper derrick. The upper cables are therefore detached from the tower and reattached to the tower at the next higher level and tightened equally to prevent movement of the derrick.

The crew then plumbs and levels the outside forms and fixes them into place. Reinforcing steel is set in place, as is done conventionally, inside the outside forms.

Inside casting forms are supported by wire ropes of the same pulley post system which supports the work deck. The inside forms are broken loose from the concrete of the previous day's pour and kept suspended from outriggers of the upper derrick by the wire ropes of the pulley post system.

The hydraulic rams are then retracted, retracting the lower part of the derrick upward into the upper part, which upper part is suspended by upper cables from the tower. During retraction the lower cables slacken and the load of the derrick is taken by the upper cables. The retraction also causes the lower part of the derrick to pull in the pulley post wires which raise the work deck simultaneously with the inside forms.

The tower ends of the slackened lower cables are disconnected from the tower and reconnected to the tower at the next higher level and are tightened. The inside forms are leveled and set in place. Concrete is then poured from the work deck between the inside and outside forms.

The crew then departs for the day and allows the concrete to set overnight. Next morning the concrete into which the derrick will next be anchored is tested for strength. If the concrete is strong enough, the process is begun again at the next level.

Towers are typically tapered from a large diameter bottom to a small diameter top. It is therefore desirable to have some means of reducing the diameter of the work deck as the derrick is raised up the tapering tower. For this purpose, the present invention provides an adjustable diameter work platform. The platform comprises a pair of (in plan view) identical polygons of girders between joints. The polygons are spaced vertically by upright members between their joints. The vertical quadrangles thus formed are triangulated by diagonal rods. Wooden beams radiate horizontally from the upper joints and are clamped at their ends by endpieces comprising extensible support means such as radially slidable boxtubes or the like. These boxtubes can be extended to rest the platform temporarily atop the last level of the tower. Adjustable tensile members such as cablejacks triangulate between each endpiece and an associated lower joint. Carrier beams run across the primary beams and are attached to the derrick outriggers by the pulley post system. The deck is formed by plywood over joists.

To adjust the size of the deck, the workers cut away an annulus of the plywood decking, remove any joists which have thereby been uncovered, unclamp each endpiece and roll it towards the center on tracks, cut back the primary beam associated with said endpiece, roll each endpiece out to the new beam end, and secure the endpiece to the new beam end.

ADVANTAGES

An advantage of the present invention is that, once the cables are properly set, the derrick can be raised by one man operating a single pump which pressurizes the hydraulic cylinders, rather than by a large crew of men who have little else to do when not jacking. Thus the work crew can be sized to work efficiently with each man using his job time effectively. The cost savings of eliminated wasted man hours are an advantage.

Another advantage is that the derrick automatically stays level while being raised, without constant attention to make sure each jack elevates level to the others. This creates an ancilliary advantage of reduced strain on the derrick from uneven jacking.

A further advantage is that many steps are eliminated or combined. The steps of raising the upper derrick and raising the outside forms are combined together, as are the steps of raising the work deck and raising the inside forms.

Another advantage is that these raisings occur semi-automatically without excessive attaching and detaching of chain hoists to the inside forms, outside forms, work platform, or angle ring.

A still further advantage of the derrick is that it is not lifted from the outside angle ring, which has always been a concern on manually raised derricks.

Advantages of the radial beam work platform structure are as follows:

The deflection of this deck is greatly reduced from that of a parallel beam deck.

No large horizontal stresses are placed on the top of the column wall during the derrick raising operation.

Over 90% of the weight of the radial deck can be assembled at ground level with the other 10% added after the deck clears the derrick bracing. This is in contrast to a conventional deck which is built in a doughnut configuration, with 50% of the weight added after the deck clears the derrick bracing.

No moment splices are required on this deck.

A variety of column diameters can be achieved without having to re-design the entire deck. Also, minimal detailing changes are required for each new job.

This is a standardized deck, which will accommodate a host of chimney diameters. The parallel beam deck had to be designed and detailed for each chimney job.

There are no cantilevered joists on this deck. The absence of cantilevered joists reduces the weight of the deck. A conventional deck has joist cantilevers and at their locations the joists have to be doubled up. Many times the field personnel are left to their own discretion on conventional decks as to where to double the joists.

Interference between posts of the derrick and main suport members of deck will not occur on this deck since main support members do not run through the derrick as they do on conventional decks.

This deck can be used just as easily with the manually operated derricks as with the hydraulically operated derricks. In fact the real advantage of the sliding end piece and cable is realized more on manually raised derricks since the deck must always be supported from the column wall during the derrick raising operation.

This deck is structurally more sound than the parallel beam deck.

The work platform structure is adapted to the use of inexpensive paired 2×12 timbers in the beams rather than larger, rarer and more expensive timbers. The two smaller timbers are also less susceptible to unacceptable checking than is a single large timber. The bracing for the work platform is beneath the work deck, so as not to impede workers on the deck.

OBJECTS

Objects of the present invention are to reduce the necessary work crew size, to reduce the time required for jacking, to simplify procedures and thereby enhance safety, to standardize, strengthen, and lighten the work deck, and to reduce the rising costs of constructing towers and chimneys.

BRIEF DESCRIPTION OF THE DRAWINGS

FIG. 6 is a detail elevation of an endpiece of a deck scaffold beam.

FIG. 7 is a detail elevation of a pair of cross-channels of the deck scaffold.

DESCRIPTION OF THE PREFERRED EMBODIMENT

A presently preferred exemplary embodiment of the invention follows.

Figure 1:
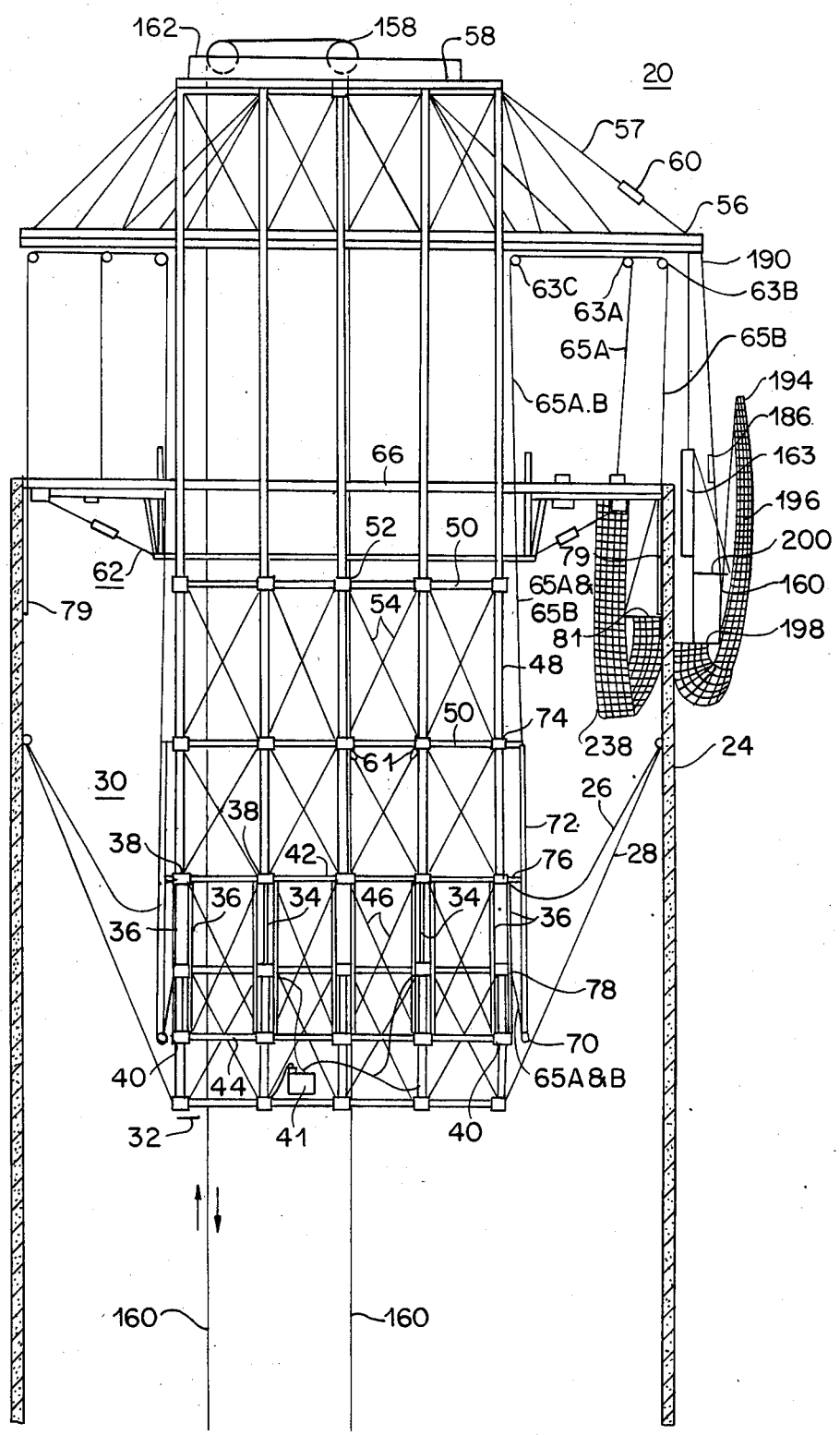
FIG. 1 is an elevation of a partially extended derrick suspended within a tower.
Figure 36:
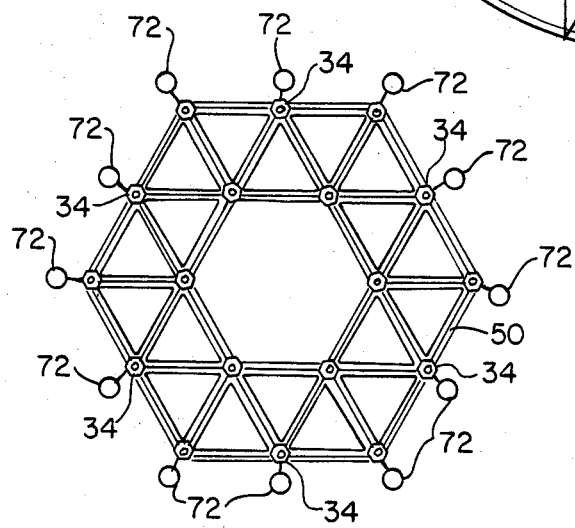
FIG. 36 is a plan view in section of the derrick.

As shown in FIG. 1, a derrick, generally designated 20, is used to construct a tower, whose cylindrical wall 24 is shown in cross section. Derrick 20 is supported from wall 24 by upper cables 26 and/or lower cables 28. Derrick 20 comprises two parts, an upper derrick 30, and a lower derrick 32, which are joined to each other by means of hydraulic rams 34, shown in FIG. 1 in a partially extended position. Six of these rams 34 (e.g., Pathon Series 3H Heavy Duty Non-Tie Rod Hydraulic cylinders with an 8 foot stroke) are mounted on six of the twelve vertical peripheral support members of the derrick; every alternate support member comprising a ram (FIGS. 1 & 36). Reinforcing struts 36 brace from joints 38 to sliders 40 (FIG. 1).

Derrick 20 can be extended or retracted by pressurizing these six rams 34 from a single conventional hydraulic pumping unit 41. As shown schematically in FIG. 37, the pumping unit 41 comprises a pump 400 immersed in an oil resevoir 401, a drive motor 402, a four-way control valve 404, and two six-way hydraulic flow-dividers or flow-equalizers 406, 407.

Figure 37:
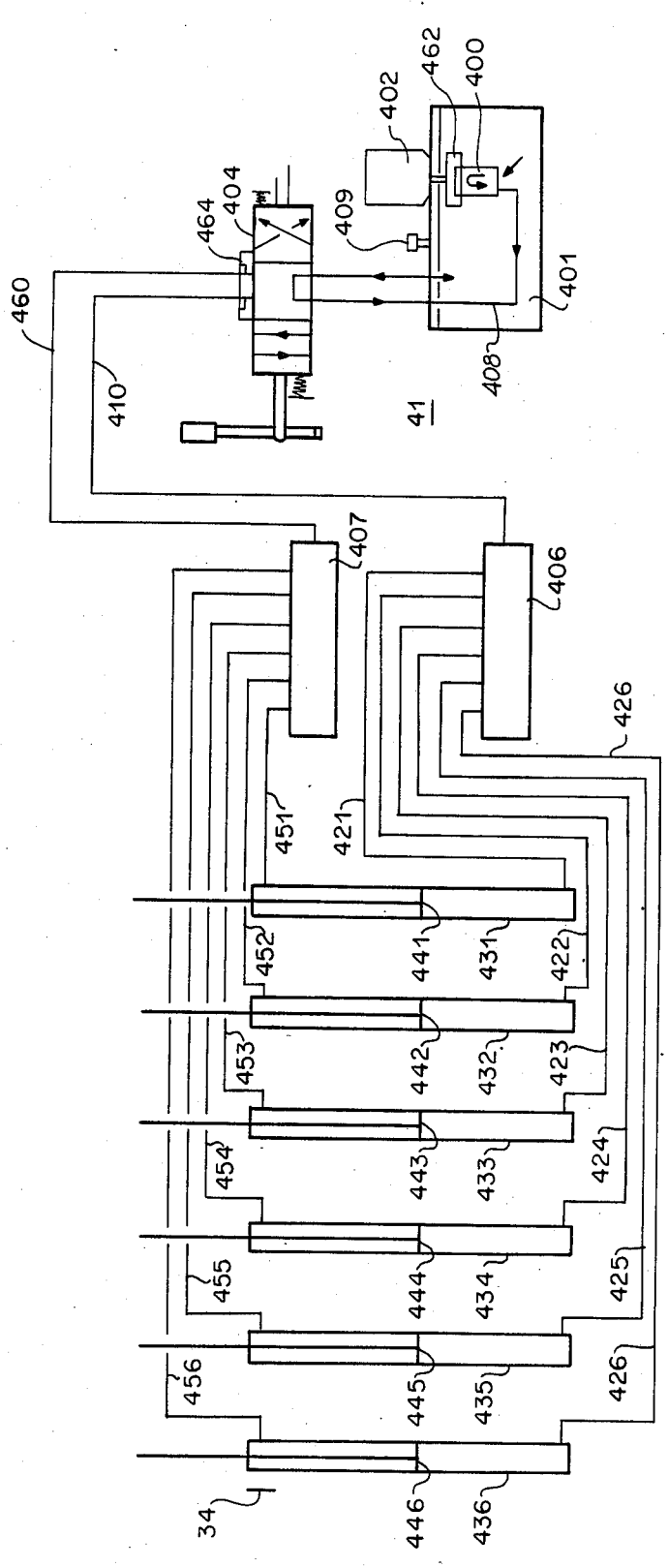
FIG. 37 is a simplified schematic of the hydraulic system.

Control valve 404 is normally spring biased to a neutral position as shown in FIG. 37. When motor 402 is actuated it drives pump 400, preferably a piston-type hydraulic pump. Pump 400 draws oil from the unpressurized reservoir through the pump's intake port and then pumps the oil through hydraulic line 408 to four-way control valve 404 mounted on pumping unit 41. The neutral valving returns the fluid to reservoir 401.

Oil breather 409 relieves pressure anomalies within reservoir 401. To extend the derrick by rams 34, valve 404 is pushed to the right so that fluid flows straight through from line 408, to line 410, to a conventional six-way flow-equalizer 406, such as a Delta Series P (P23-57).

Flow-equalizer 406 divides the flow so that an equal amount of fluid flows at an equal rate into lines 421–426 regardless of unequal back-pressure from loads on those lines. Thus, hydraulic fluid is pumped at the same rate through lines 421–426 into the bottom of cylinders 431–436 which drive the six pistons 441–446 upward at the same speed and position. The pistons force fluid out the top of cylinders 431–436 through hydraulic return lines 451–456, to six-way flow-equalizer 407 through return line 460, through the return part of valve 404, and into unpressurized reservoir 401. Oil pressure relief valves 462, 464 are located on pump 400 and on valve 404 to relieve any over-pressure which might damage the system. The inventors prefer to adjust these valves to 2000 psi.

Retraction of the derrick by rams 34 is similarly accomplished by switching four-way control valve 404 to the left.

Pump 400 pumps fluid into line 408 across the "X" pattern in valve 404 to line 460 and into six-way flow-equalizer 407, which directs six equal-rate fluid-flows through six lines 451–456, into the tops of cylinders 431–436. The fluid in the cylinder tops displaces pistons 441–446 downward, retracting all the rams at the same rate and position regardless in differences in their individual loads. Pistons 441–446 displace the fluid in the bottoms of the cylinders into lines 421–426 through flow-equalizer 406, through line 410, across the "X" of valve 404, and into reservoir 401. By this means the rams are all operated in unison.

Horizontal braces 42, 44 (FIG. 1) join at joints 38 and sliders 40 to struts 36 to form vertical quadrangles which are triangulated by diagonal rods 46 to form a rigid framework. Likewise, the rest of the derrick 20 is comprised of upright aluminum tubes 48, and horizontal aluminum "L" braces 50, joined by specially designed interchangeable joints 52, and triangulated where appropriate by diagonal rods 54 of adjustable length. This structural system is more fully described in the above-mentioned Sapp patent, which is hereby incorporated by reference in this specification.

Figure 16:
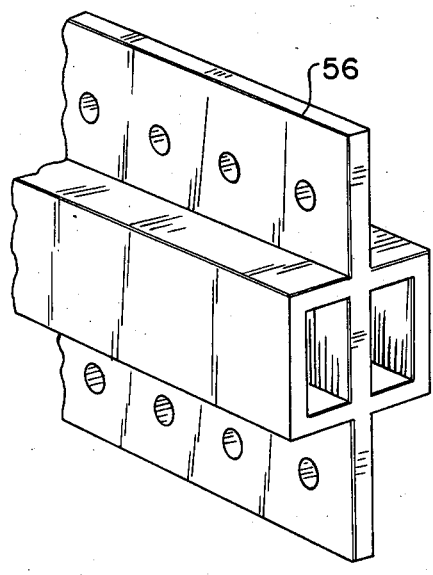
FIG. 16 is an oblique view of an end of a derrick outrigger.
Figure 34:
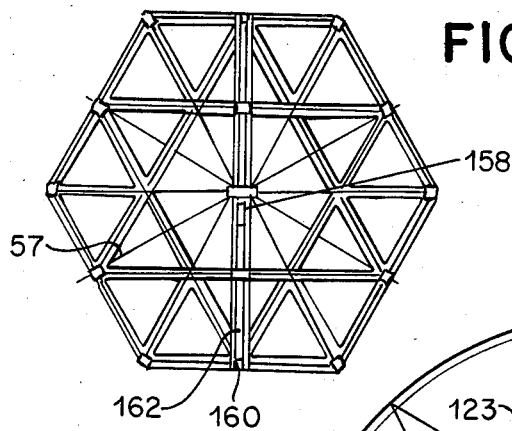
FIG. 34 is a plan view of the top of the derrick.
Figure 35:
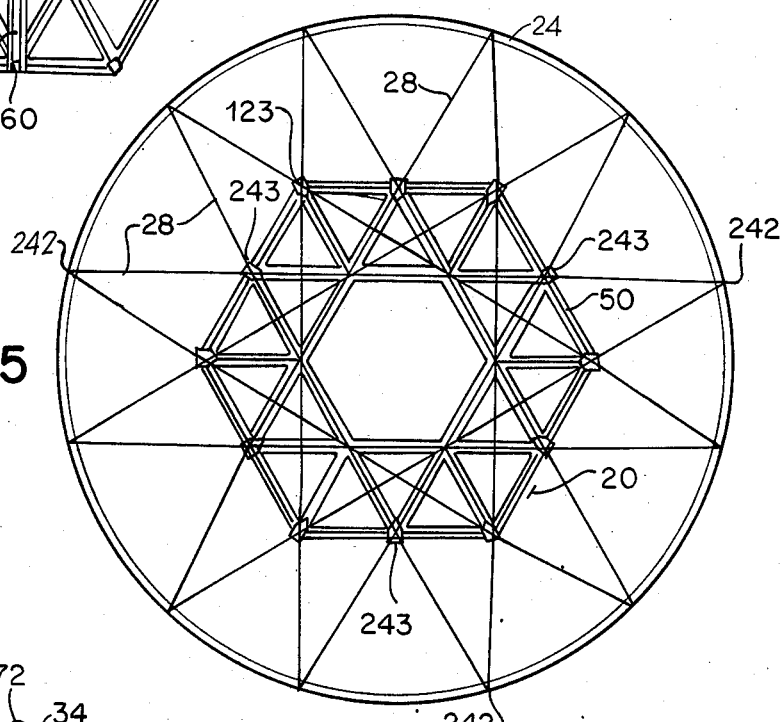
FIG. 35 is a plan view of the bottom of the derrick showing the cable support scheme.

Extending from joints near the top of derrick 20 are horizontal outriggers 56 which, as in FIG. 16, may be extruded aluminum beams of thin vertical section reinforced by a central box and perforated to accept hooks, shackles, and like support means for hanging pulleys or the like. As in FIG. 1, outriggers 56 are supported by diagonal cables or rods 57 from the top 58 of derrick 20. It is generally advisable on all diagonals 46, (FIG. 5) 54, 57 (FIG. 1) to provide turnbuckles 60, 61 for adjusting rod length and tension after assembly. Rods 46, 54 are themselves each threaded on both ends and reverse threaded on one end to serve as turnbuckles in threaded U-straps 61. FIGS. 34–36 show plan views of derrick 20.

A work platform or scaffold, generally designated deck scaffold 62 and shown in FIG. 1 in simplified section is suspended from pulleys 63A on outriggers 56 by wire ropes 65A. The scaffold comprises a plywood work deck 66 and a supporting understructure, better shown in FIGS. 4–6.

As in FIG. 1 wire ropes 65A, 65B turn respectively around pulleys 63A, 63B and both wires turn round double-sheave pulley 63C, wherefrom they extend down to and around double sheave pulley 70. Pulley 70 is mounted on the bottom of pulley post 72. Pulley post 72 is mounted projecting downward from joints 74, 76 on upper derrick 30. Wire ropes 65A, 65B terminate at attachment 78 on a joint of lower derrick 32. The geometry of this pulley post arrangement causes scaffold 62 and inside forms 79 to remain stationary relative to the lower derrick 32 when the derrick is extended or retracted.

Figure 2:
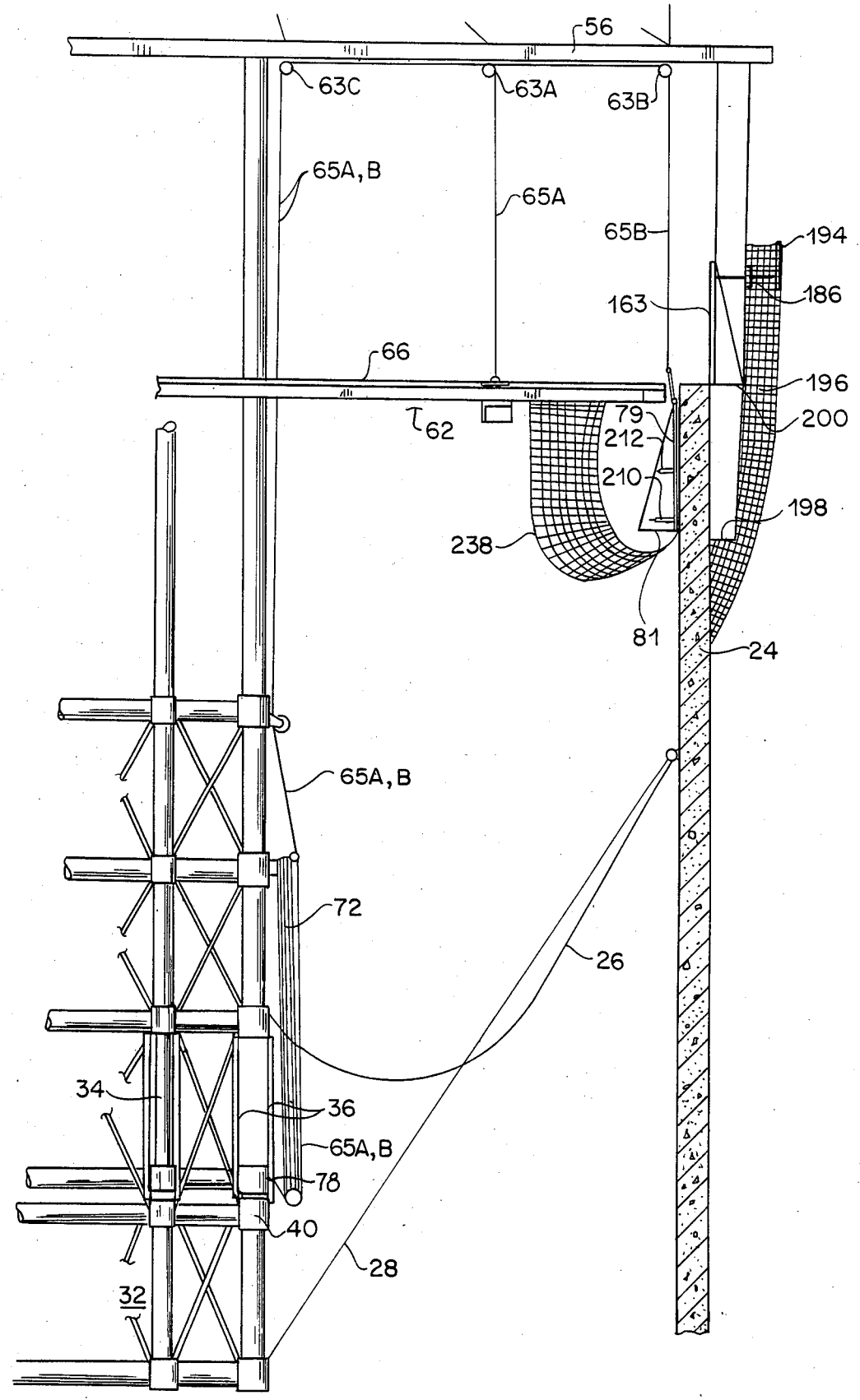
FIG. 2 is an similar view of part of FIG. 1 detailing an extened derrick.

Thus, when the derrick 20 is extended, the upper derrick 30 and its attached pulley post 72 rise relative to the supporting lower derrick 32 (which is stationary relative to tower 24). Since pulley post pulley 70 is rising closer to wire rope attachment point 78, it pays out wire ropes 65A, 65B to lower deck scaffold 62 and inside forms 79 away from outriggers 56 at the same rate that upper derrick 30 is rising. Thus, scaffold 62 is maintained at the same height relative to lower derrick 32 and tower 24. FIG. 2 shows the pulley post on extended derrick 20.

Figure 3:
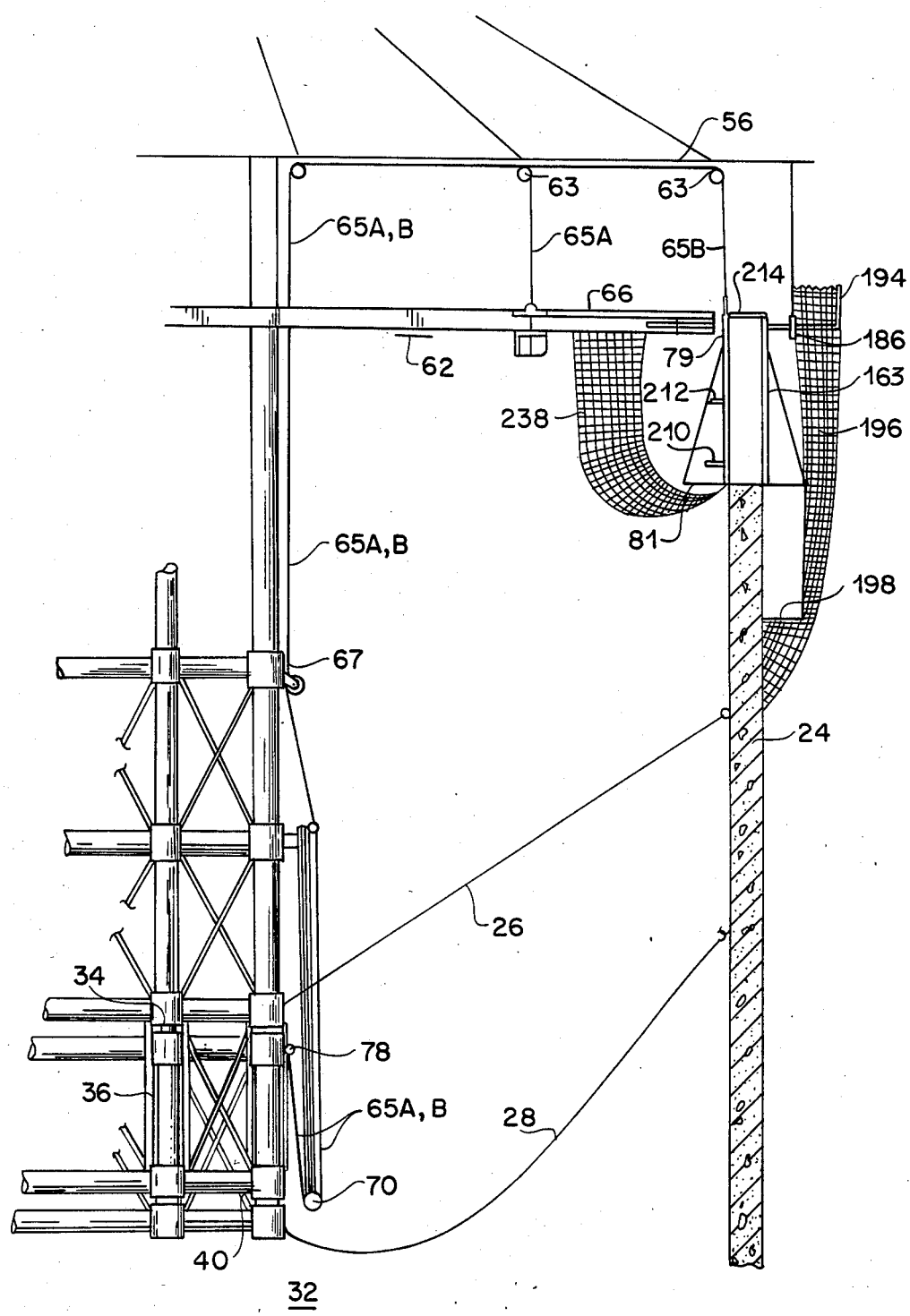
FIG. 3 is similar view of a retracted derrick.

When the derrick load is taken on upper derrick 30 by upper cables 26, and the derrick 20 is retracted, scaffold 62 similarly rises with lower derrick 32. FIG. 3 shows the pulley post system with derrick 20 retracted.

As in FIG. 2, inside casting forms 79 and associated inside scaffolding 81 are suspended from wire ropes 65B and move in unison with and below scaffold 62.

Figure 4:
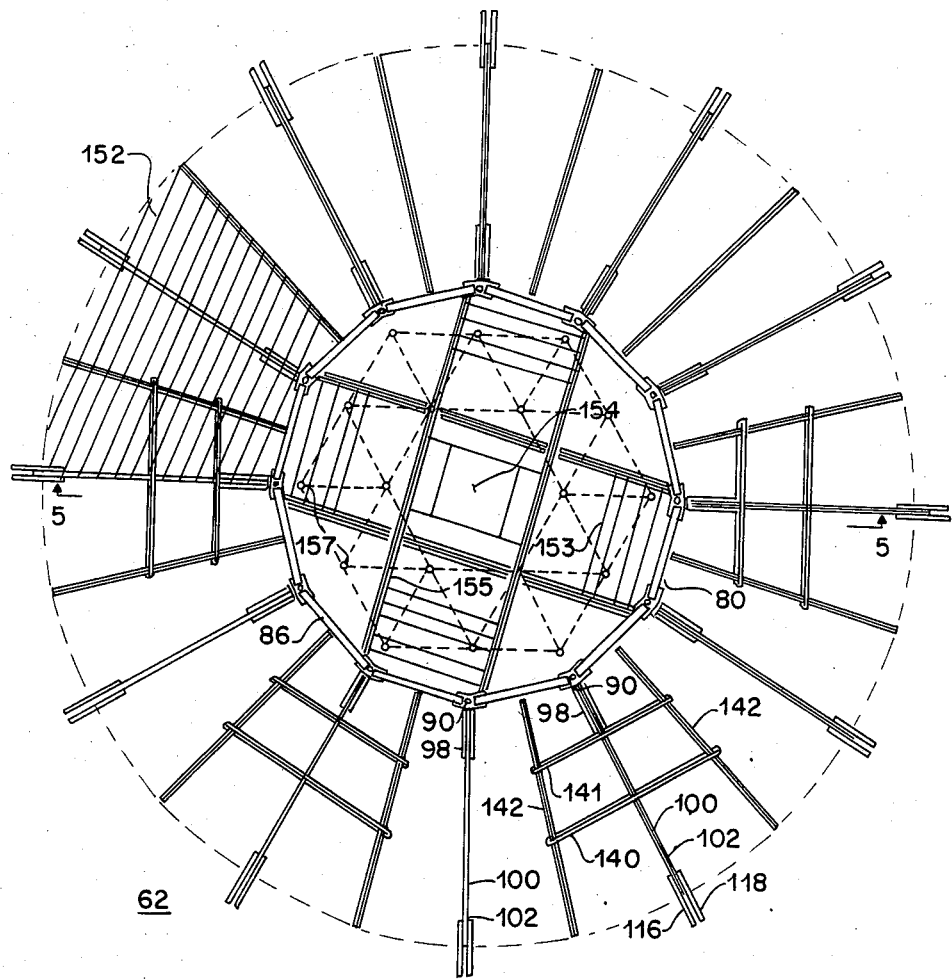
FIG. 4 is a plan view of the deck scaffold in section.
Figure 5:
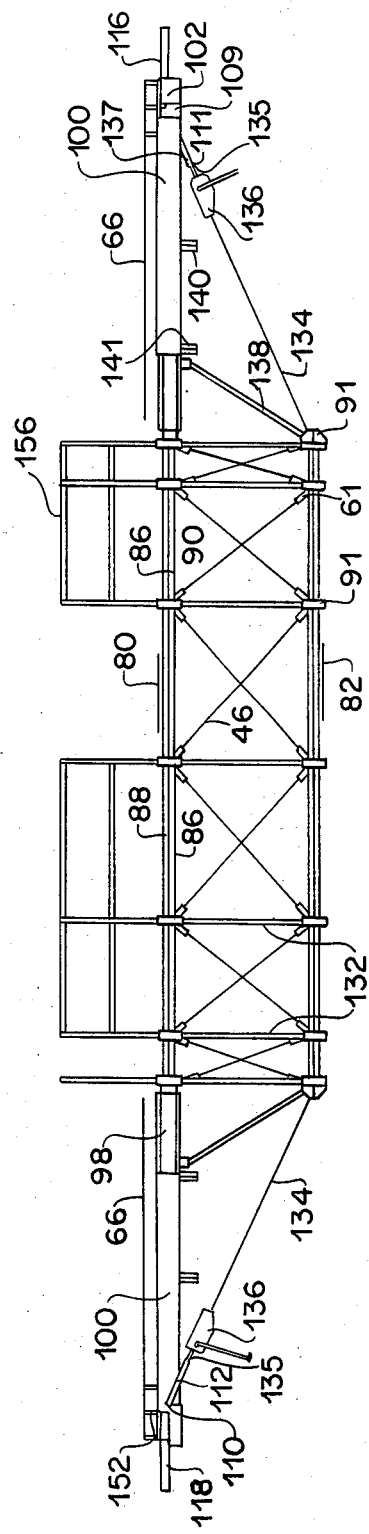
FIG. 5 is an elevation in section of the deck scaffold.
Figure 8:
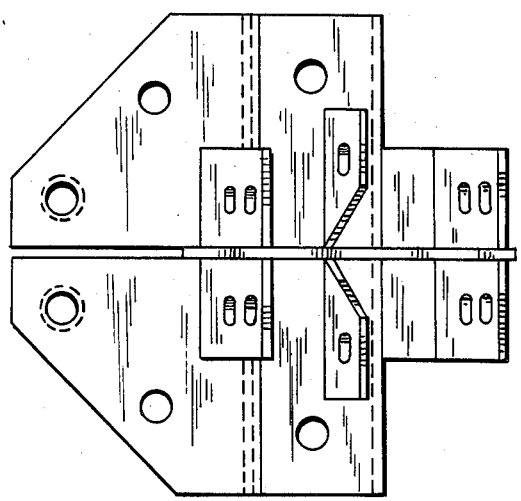
FIG. 8 is an elevation of a joint of the deck scaffold.
Figure 9:
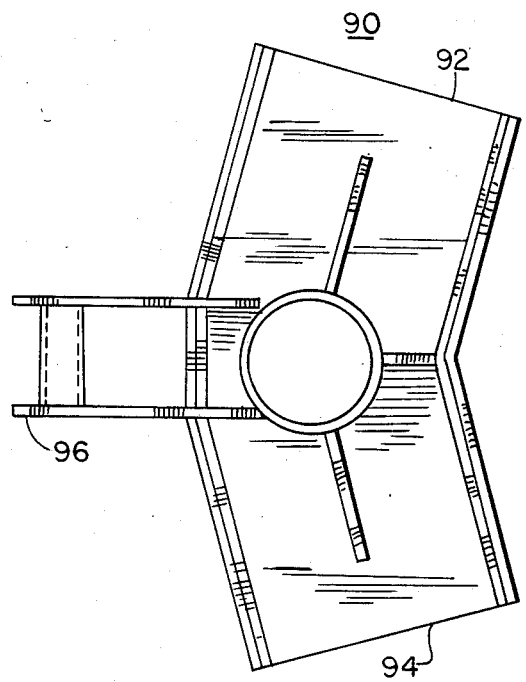
FIG. 9 is a plan view of the same joint.
Figure 10:
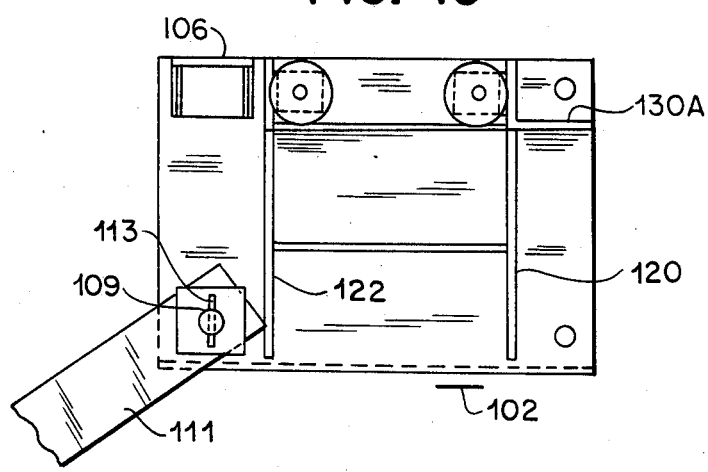
FIG. 10 is a side elevation of the end piece housing.
Figure 11:
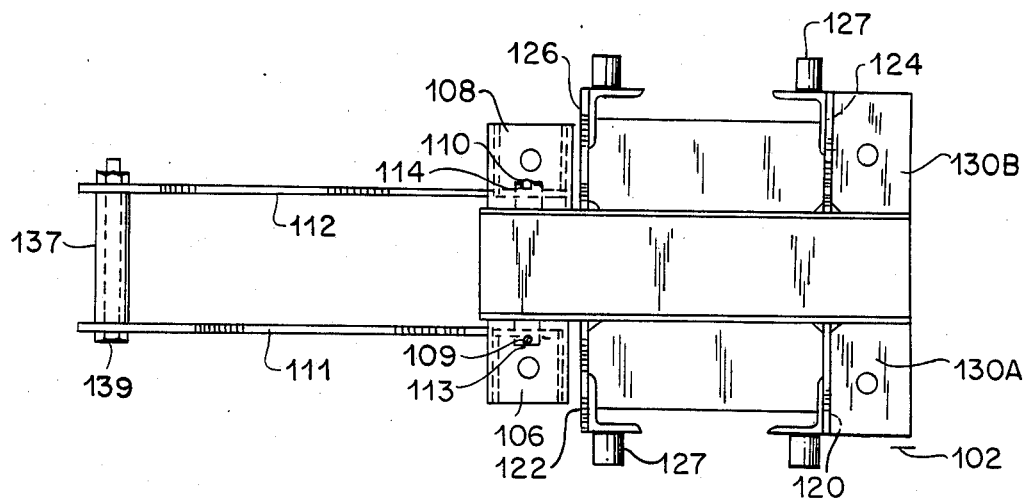
FIG. 11 is an plan view thereof.

The deck scaffold 62 is best shown in FIGS. 4–6. As in FIG. 4, the scaffold comprises an inner framework which, when viewed in plan, forms a twelve-sided equilateral upper polygon 80. As in FIG. 5, a lower polygon 82, substantially identical to the upper polygon, is spaced about 6 ½ feet below upper polygon 80 in vertical alignment therewith. Each polygon 80, 82 comprises aluminum horizontal members, each member comprising a pair of channels 86, 88, each channel of the pair having its mid-side facing the other as in FIG. 7. Each channel 86, 88 (FIG. 5) is connected to its adjacent channels by joints 90, 91 the configuration of which is shown in FIGS. 8-9. Each joint 90 has two arms 92, 94 to which channels 86, 88 are bolted and a third arm 96 to which pairs of aluminum channels 98 are bolted, FIGS. 4-5. Each channel 98 is in turn bolted to an associated primary beam 100. The twelve primary beams 100 each comprise two standard 2×12 timbers, each beam being capped at its circumferential end by endpiece 102. FIGS. 6 and 10-13 show this endpiece in detail. Endpiece 102 is a "U" shaped piece (when viewed as in FIG. 12 from the beam end) which fits around beam 100 (FIG. 13) on two sides and on the bottom and is clamped by tube 104 which bolts onto flanges 106, 108. Pins 109, 110 protrude laterally out from the sides of endpiece 102 on the lower and centerward portions of those sides (FIGS. 10-13). Straps 111, 112 are drilled at their ends to accept pins 109, 110 and are thereby pinned to endpiece 102. Clevis pins 113, 114 are press-fitted into holes in pins 109, 110 to retain straps 111, 112 on pins 109, 110.

Figure 13:
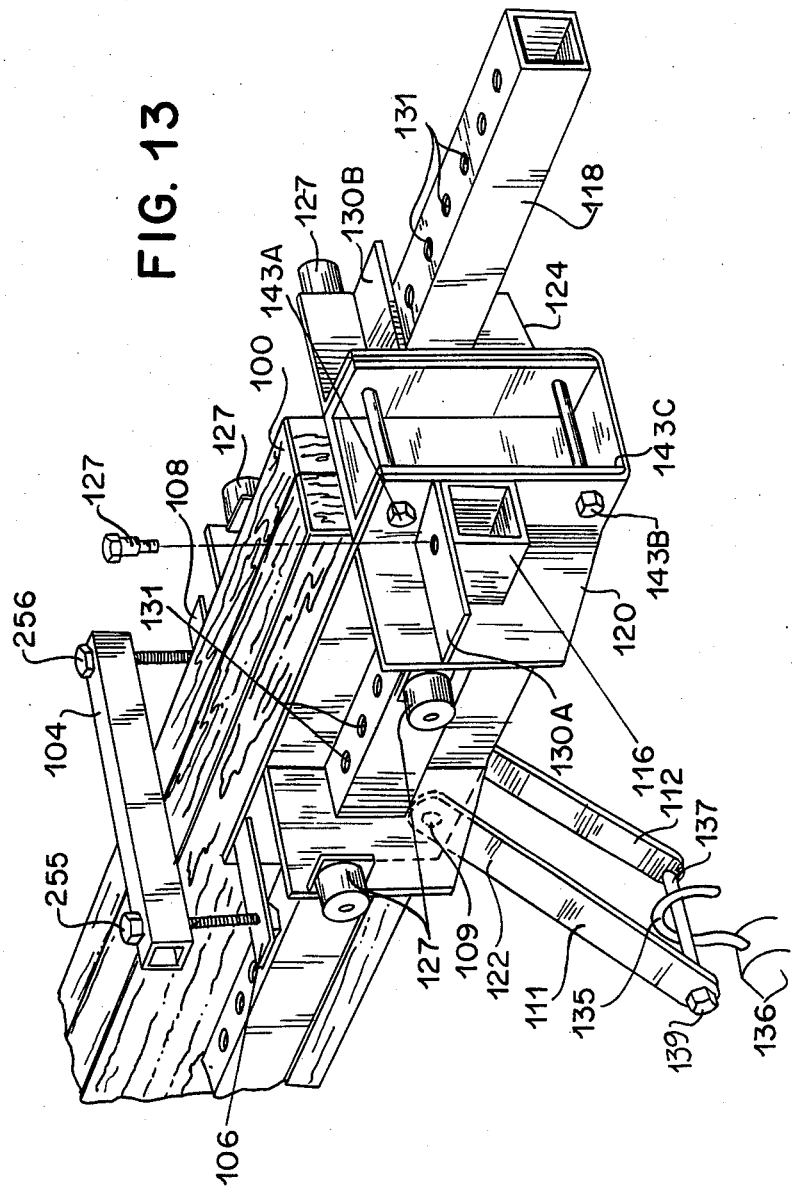
FIG. 13 is an oblique view of the complete endpiece.

Each endpiece 102 has a pair of box tubes 116, 118 slidably mounted in holes in flanges 120, 122, 124, 126 as in FIG. 13. These tubes 116, 118 function as shown in FIG. 6 to help support scaffold 62 by resting its weight via 4×4 spacer block 128 on wall 24. Tubes 116, 118 are retracted when it is necessary to laterally clear inside forms 79 as they are being set in place or clear the reinforcing steel as scaffold 62 is being raised. Pins 129 can be inserted through holes in flanges 130A, 130B and through one of any of the plurality of holes 131 atop tubes 116, 118, to fix tubes 116, 118 into either an extended or retracted position (also shown in FIG. 13). At higher levels where the tower has tapered, the scaffold becomes lighter as it is cut away and there is no longer a need to extend tubes 116, 118. They can then be removed and sent down, in order to reduce scaffold weight further.

Figure 12:
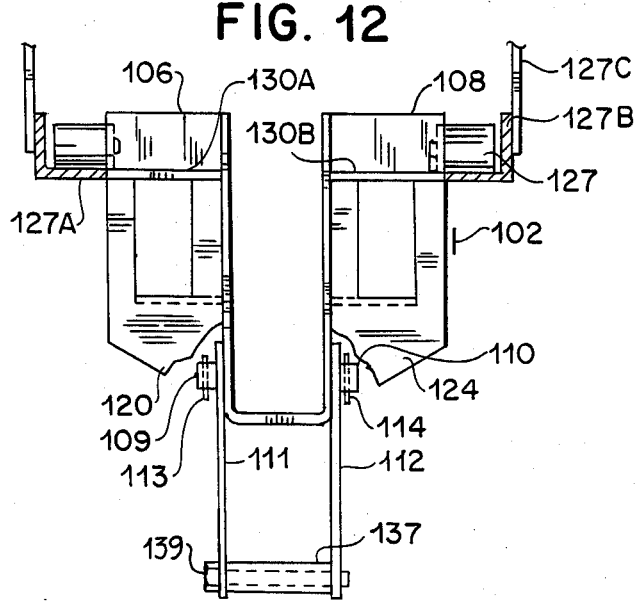
FIG. 12 is a end elevation thereof.

Flanges 120, 122, 124, 126 also are mounting sites for roller bearings 127 which extend out from the flanges and rest on tracks 127A, 127B, comprised of light aluminum or steel angle hung from hangars 127C attached to the understructure of the deck (FIG. 12). The tracks run parallel to the beam of their associated endpiece 102.

As shown in FIG. 5, lower polygon 82 is spaced below upper polygon 80 by vertical aluminum tubes 132 connecting joints 90 and joints 91. The resulting vertical quadrangles are triangulated by diagonal rods 46. A cable 134 and cablejack 136 (e.g., a conventional TU-28 Griphoist) form an adjustable tensile member which triangulates between straps 111, 112 on each endpiece 102 and an associated joint 91 on lower polygon 82. The hook 135 of Griphoist 136 hooks spacer pipe 137 (FIGS. 11 and 12) between straps 111, 112, through all of which bolt 139 is secured to form a loop means for hook 135 to hook onto. Bolts 143A, 143B (FIG. 13) through bearing piece 143C secure the bearing piece to the endpiece 102. Bearing piece 143C keeps end piece 102 out at the circumferential end of primary beam 100. Thus bolts 143A and 143B serve as pin means barring the open distal end of the housing of the endpiece, preferably when used in conjunction with bearing piece 143C. Knee brace 138 (FIG. 5) functions when the scaffold is raised at the polygon and when griphoist 136 is removed for small column diameters.

Figure 14:
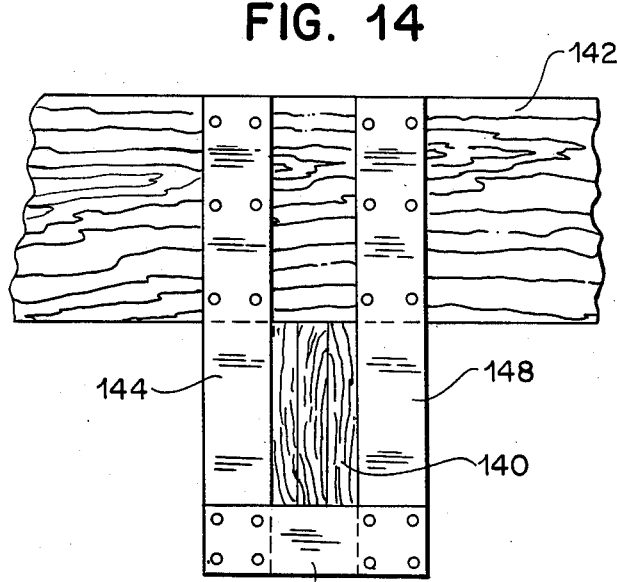
FIG. 14 is a detail elevation of the joint between a secondary beam and a carrier beam.
Figure 15:
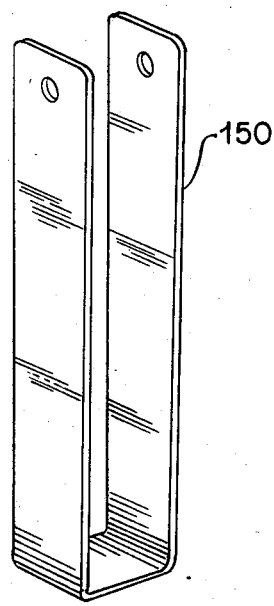
FIG. 15 is an oblique view of a U-strap for supporting the deck scaffold.

Carrier beams 140, 141 (FIG. 4) are mounted horizontally and perpendicular to primary beams 100 beneath the primary beams. Secondary beams 142 radiate from near upper polygon 80 to the outer radius of primary beams 100. The secondary beams are intermediate the primary beams and atop the ends of carrier beams 140, 141. FIG. 14 shows how secondary beams 142 are attached to carrier beams 140, 141 by 2×4 wooden members 144, 146, 148, which also serve to clamp together three 2×10 timbers which comprise each carrier beam 140, 141. About midway on each carrier beam 140, 141 between its primary beam 100 and its secondary beams 142 are mounted "U" shaped steel straps 150 (FIG. 15) which protrude through holes in work deck 66 and serve as attachment points for a bridle which attaches to wire rope 65 and supports the entire scaffold 62 by the pulley post system.

Figure 26:
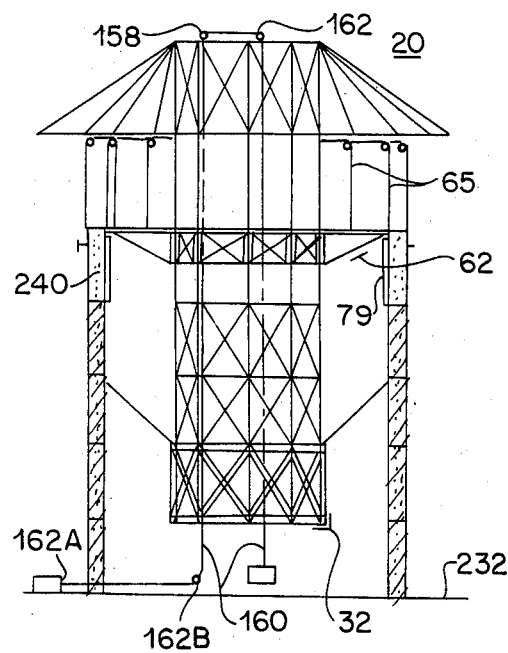

As in FIGS. 4-6, 2×6 wooden joists 152 are laid in sections at a radial spacing of one foot on centers parallel to each other and across a group of four primary and secondary beams. Eight such sections are laid around scaffold 62 outside upper polygon 80. Plywood decking is nailed down onto joists 152 to form work deck 66. Inside the polygon 80, the plywood decking rests upon joists 153, which rest upon channel beams 155. Each beam 155 comprises a wood timber in the center with an aluminum channel on either side. The mid-side of each channel is secured to a side of the timber, forming a composite I-beam. The decking structure inside polygon 80, comprises the interior ramps, which are only added to the scaffold after the scaffold is raised high enough to clear cross bracing 50 and diagonal bracing 54 (FIG. 1) of the derrick. Holes are cut in deck 66 for passage therethrough of verticals 157 above their cross bracing (FIG. 4). A 4'×6' opening 154 (FIG. 4) is left in the center of the deck for sending men, material and equipment up and down therethrough. Safety rails 156 (FIG. 5) may be provided around opening 154. Men and materials are brought up and down to and from deck scaffold 62, through opening 154, by means of a hoist 158 (FIGS. 1 and 34). The hoist comprises a cable 160 run through a cathead 162 and down the inside of wall 24 through a turning block 162B at the tower base to a motor 162M on the ground (FIG. 26).

The concrete casting forms are conventional but will be described here for convenience.

Figure 17:
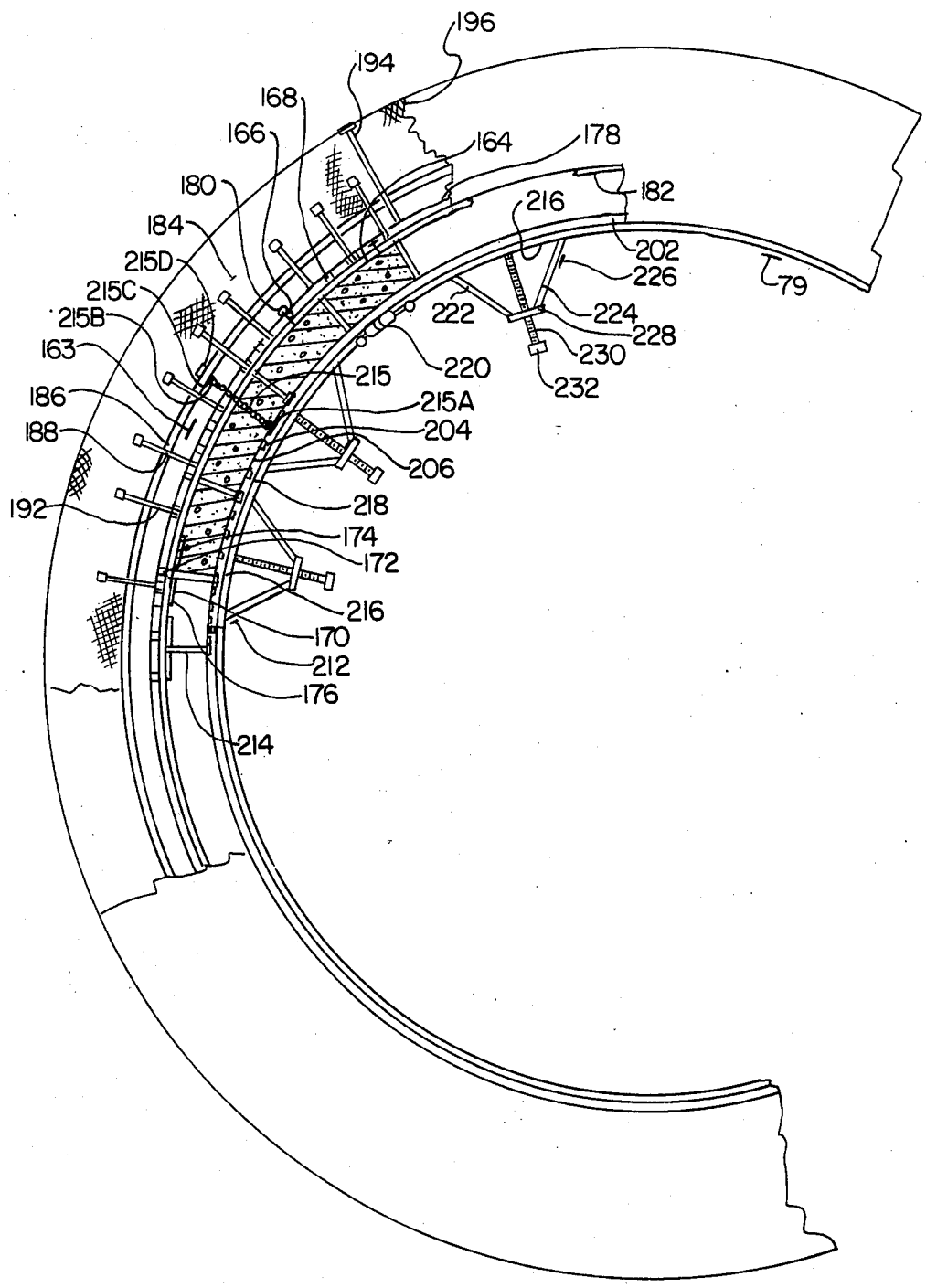
FIG. 17 is a plan view of the casting forms.

Outside forms 163 are thin (about 16 gauge) metal sheets 164 (FIG. 17) with vertical steel T-bars 166 at the splices of the sheets and 2×3" timbers 168 on the sheets providing vertical stiffness. The side edges of forms 163 are straight lines but the sheets taper in shape toward their tops consistent with the designed taper of the tower. If the forms do not encircle the tower without a gap, a lapping sheet 170 is braced in the gap 172 beneath the end forms 174, 176. A steel band tightened by a turnbuckle secures the bottom of the forms cast against the top of the already cast part of the tower. Intermediate steel band 178 tightened by turnbuckle 180 similarly secures around the forms slightly above the middle of sheets 164. A waler 184 secures the top. Waler 184 comprises a steel ring 186 having a plurality of holes 188. Ring 186 is suspended from the derrick outriggers 56 by chain hoists 190 about a foot out from the planned circumference of outside forms 163 (FIG. 1). As in FIG. 17, ring 186 has, through holes 188, a plurality of screw adjustors 192 radially positioned by nuts at the waler rings. The threads on these nuts and adjustors 192 are steep Acme threads for quick adjustment. The adjustors can be tightened or loosened to control the position of the tops of outside forms 163. Netting outriggers 194 project from waler ring 186 and support external safety netting 196 which extends as in FIGS. 1, 2, 3 from above work deck 66 down to where it is secured beneath the lower scaffold 198 of two levels of external scaffolds 198, 200 used for working on outside forms 163.

Returning to FIG. 17, inside forms 79 are similar to outside forms 163 in their structure of thin metal sheets 202 reinforced and joined by tubes 204 and angles 206. Two inside walers 210, 212, (FIG. 3) one near the bottom of the forms, the other slightly above the middle, brace inside forms 79 outward against tower 24 on their bottoms and against spacers 214 from the outside forms 163 at their tops. (Also shown in FIG. 17.)

Also pulling outward on the inside forms are chains 215, spaced about 2 feet apart, each secured by shackle 215A to the top of inside form 79 and at the chain's outside end to a hook 215B, secured to an eyebolt 215C, running through a hole in angle ring 186. Eyebolt 215C is secured adjustably to angle ring 186 by a nut 215D screwed onto the outside end threads of the eyebolt.

Inside walers 212 comprise a plurality of sections of U-channel 216, joined at their ends 218 to each other and placed under circumferential expansion by a steamboat ratchet 220.

At each level of the tower the appropriate curvature of that level of each section of U-channel 216 is stabilized by the combination of two struts 222, 224, which form an A-frame 226 against the section 216, and an internally threaded apex piece 228 joining struts 222, 224, through which a threaded rod or screw 230 with wrenchable head 232 may be adjustably screwed. By tightening the screw 230 against U-channel 216 the curvature can be changed to create a smaller circle as the tower tapers up. As the circle shrinks, waler sections 226 are removed, as are sections of outside waler 184 and inside forms 79 and outside forms 163.

Having described the apparatus of the present invention, the method of using that apparatus to construct a concrete tower or chimney will now be described.

Figure 18:
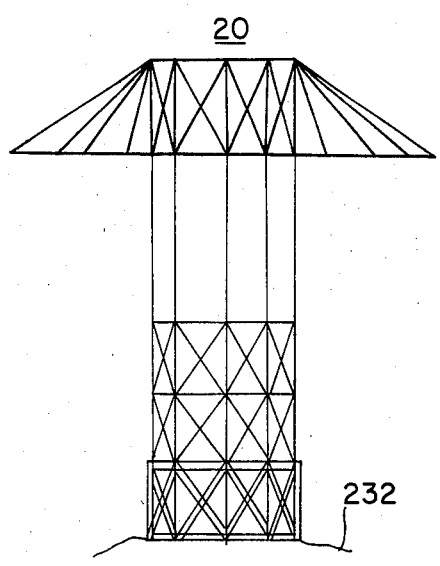
FIG. 18-33 are simplified schematic elevations of the derrick being used to construct a tower.

First, derrick 18 shown in FIG. 1 is constructed resting on ground level 232 as in FIG. 18. Work scaffold 62 (FIG. 19) is then built around derrick except for the interior ramps, which are left out so as to miss the derrick bracing 50 as scaffold 62 ascends.

Figure 19:
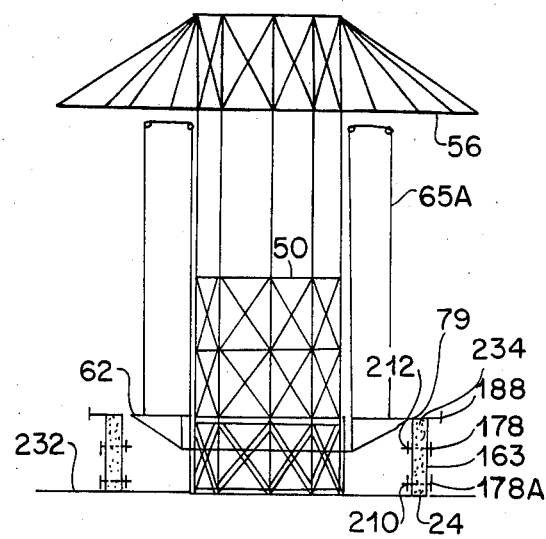
Figure 20:
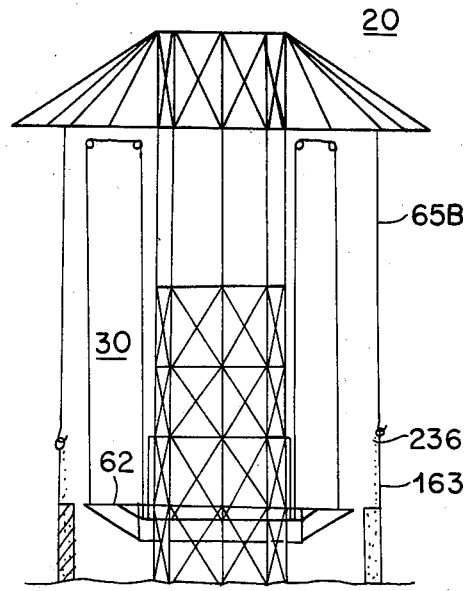
Figure 21:
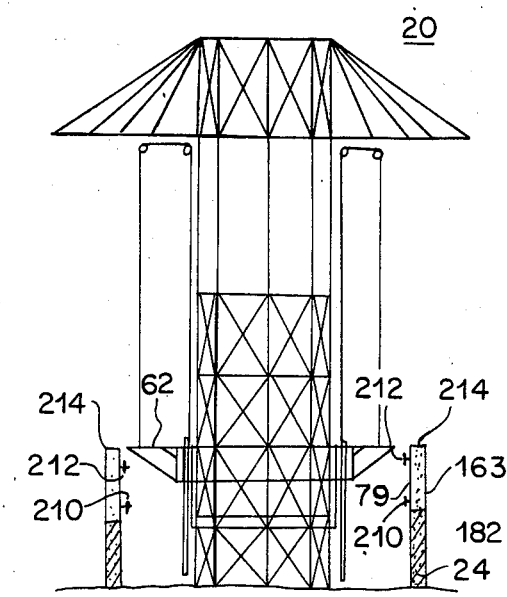
Figure 22:
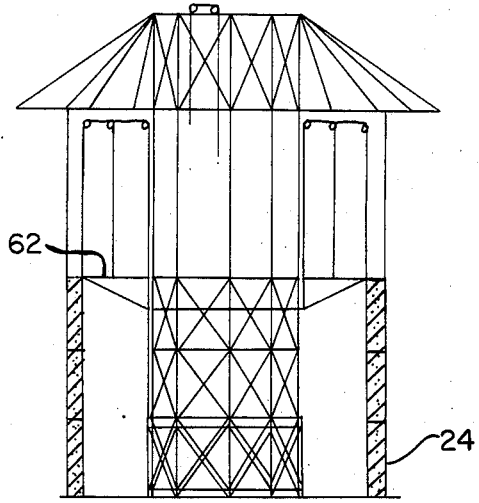
Figure 23:
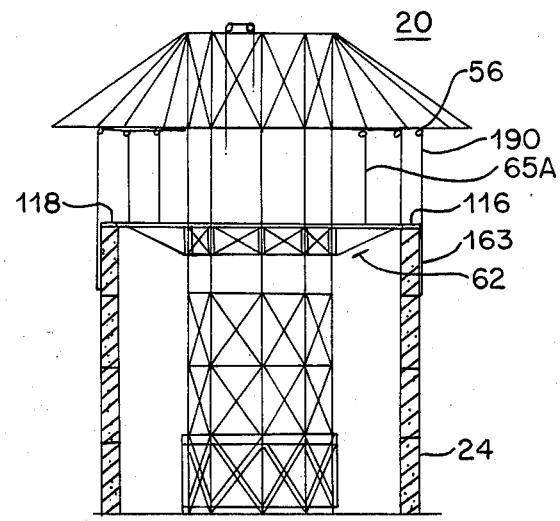

FIG. 19 shows outside forms 163 in place. Bands 178, 178A and outside waler ring 188 are emplaced and adjusted to provide the proper size outer forms. Reinforcing steel 234 is placed inside outer forms 163. Inner forms 79 are erected and their two sets of inner walers 210, 212 are placed, one set low, one set about a little above the middle. Concrete is lifted to scaffold 62 by a ground based mobile crane and is poured between forms 79 and 163 from scaffold 62 at a rate limited to about 2 feet per hour. The concrete is allowed to set overnight. Then outside forms 163 are attached to derrick outriggers 56 and broken loose from wall 24. As in FIG. 20, derrick 20 is extended, raising upper derrick 30 and outside forms 163. Forms 163 are fixed into place and reinforcing steel 236 is set into place inside outside forms 163. Chain hoists are hooked to inside forms 79, and to scaffold 62. Inside forms 79 are broken loose from wall 24. Chain hoists are used in the conventional manner to lift inside forms 79 and scaffold 62 to the next level where they are fixed in place as in FIG. 21 the next level where they are fixed in place. Walers 210, 212 hold inside forms against the top 182 of newly poured wall 24 and against spacers 214 to outside forms 163 at their tops. Concrete is poured between forms 163 and 79 and allowed to set overnight. The foregoing procedure is repeated two more times (FIG. 22) until four levels of wall 24 have been poured (FIG. 23). At this point the interior ramps of work deck scaffold 62 are constructed inside upper polygon 80 (FIG. 4). Outside forms 163 (FIG. 23) remain attached by chain hoists 190 to derrick outriggers 56 and are broken loose from wall 24.

Figure 24:
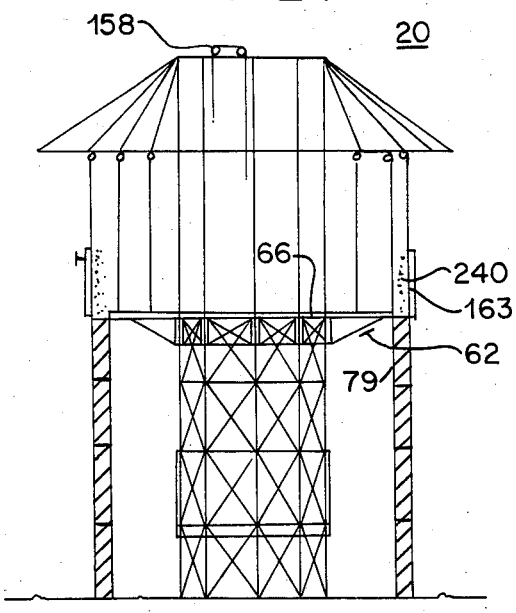
Figure 25:
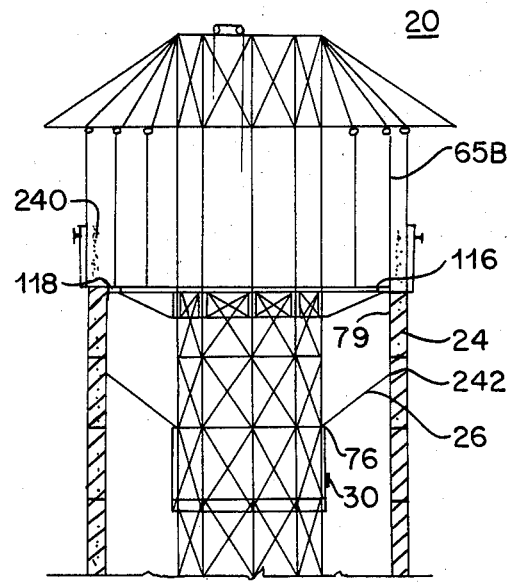

Extender box tubes 116, 118 are extended and rested on 4×4 wooden blocks 128 on wall 24 (as detailed in FIG. 6). Scaffolding 81, 198, 200 and netting 196, 238 are deployed as shown in FIGS. 1 and 2. As in FIG. 24, derrick 20 is extended, thereby lifting outside forms 163, while deck scaffold 62 and inside forms 79 remain at their original height. From work deck 66, workers plumb, level and fix outside forms 158, bring up reinforcing steel 240 by cathead hoist 158 (FIGS. 1, 34), and set the steel 240 in place. As in FIG. 25, inside forms 79, suspended by wire ropes 65B of the pulley post system, are broken loose from wall 24. After testing of the concrete, twelve upper cables 26 are attached from joints 76 on upper derrick 30 to stirrups 242 on wall 24 one level below the previous day's pour. Extender tubes 116, 118 are retracted. As in FIG. 26 derrick 20 is then retracted, raising lower derrick 32 off ground level 232 and simultaneously lifting work deck scaffold 62 and inside forms 79 by wire ropes 65 of the pulley post system as explained above and in FIGS. 1–3. Cathead hoist 158 can now be set up and used as in FIG. 26. This comprises motor and winch 162A, turning block 162B secured to ground level, cable 160, and cathead 162 with its two pulleys.

Figure 27:
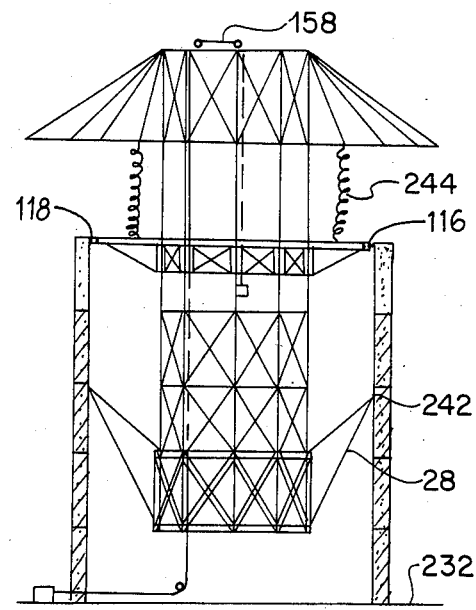

Inside forms 79 are fixed in place. As in FIG. 27, twelve lower cables 28 are hooked up to stirrups 242. FIG. 35 shows in plan how cables 28 are attached to derrick 20. Each of the twelve lower cables 28 runs from a stirrup 242 of the twenty-four stirrups serving as attachment points on tower 24, down under the lowermost joint 243 of the derrick, to which it attaches by a clamped loop of cable, under the derrick, to an opposite joint 243 to which it is similarly attached, up to an opposite stirrup 242. Thus the lower cables 28 together form a sling or basket beneath derrick 20. At higher elevations, as the tower tapers, these cables will be shortened at infrequent intervals, as dictated by a loss of headroom on the work deck. Concrete is brought up by cathead hoist 158, poured at less than 2 vertical ft./hr. and allowed to set overnight.

Figure 28:
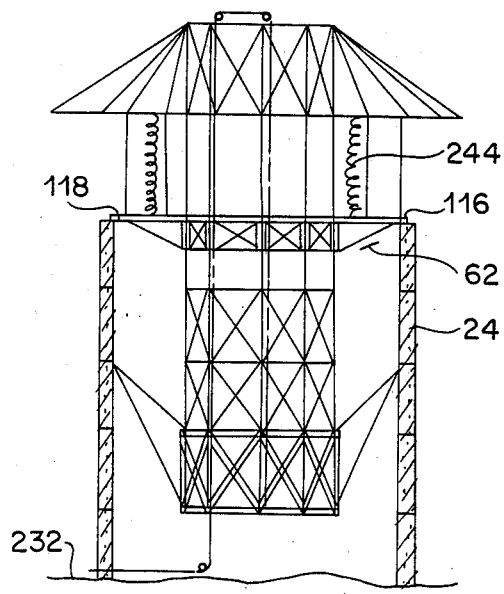

Next morning the concrete from the pour which was cast two days earlier is tested. Note that if a contemporaneously poured sample is tested, the sample should have been kept at the same altitude as its day's pour on the tower. If, as in FIG. 28, the concrete is strong enough, deck scaffold 62 is raised slightly on chain hoists 244. Tubes 116, 118 are then extended, and deck scaffold 62 is lowered onto 4×4 wooden blocks 128 resting on wall 24 as detailed in FIG. 6. Note that this step is only needed at lower levels where the tower is a large diameter and deck scaffold 62 is also large and therefore heavy. At higher elevations, where taper reduces the tower diameter, deck scaffold 62 is cut back to a smaller, lighter size, this step can be eliminated, and tubes 116, 118 can be removed and sent down to further lighten deck scaffold 62.

Figure 29:
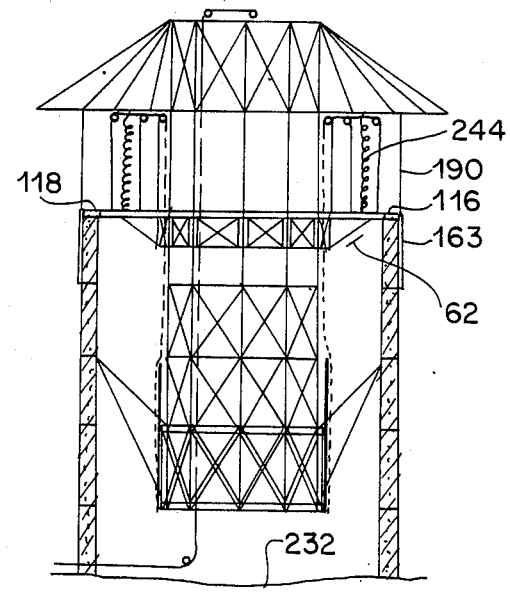

If, as in FIG. 29 extender tubes 116, 118 are being used, then chain hoists 244 are disconnected from deck scaffold 62.

The procedure for reducing the size of deck 66 is as follows, with the deck shown best in FIGS. 4, 5, 6 and 13. An outer annulus of plywood decking 66 is cut away by some kind of powersaw, such as a chainsaw, circular saw, or sabersaw. This will uncover the outermost of joists 152, which should be removed and sent down.

Bolts 143A, 143B (FIG. 13) are removed as is bearing-piece 143C. Bolts 255, 256 are loosened, unclamping boxtube 104. Endpiece 102 may now be freely rolled on bearings 127 radially inward on tracks 127A,B (FIG. 12) from the end of beam 100 (FIG. 6). Beam 100 is then cut back with a chainsaw to an appropriate radius. Endpiece 102 is rolled back to the end of cut beam 100. Bolts 143A, 143B secure bearing-piece 143C (FIG. 13) against the beam end. Bolts 255, 256 are tightened to clamp boxtube 104. Secondary beams 142 (FIG. 4) are also cut back. Deck 66 is now appropriately smaller.

FIG. 29 shows outside forms 163 suspended from chain hoists 190, being broken loose.

Figure 30:
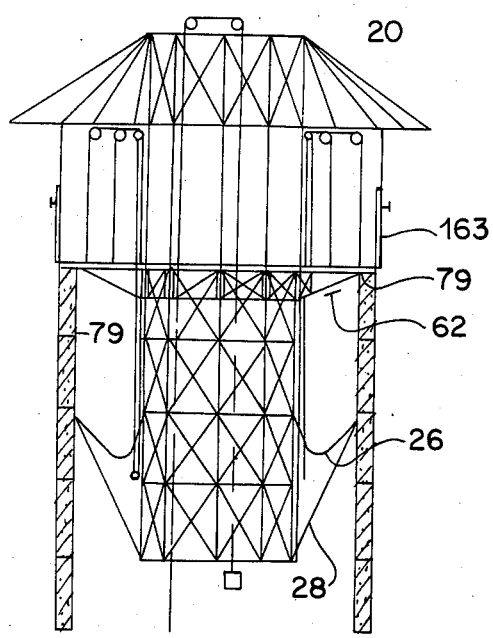
Figure 31:
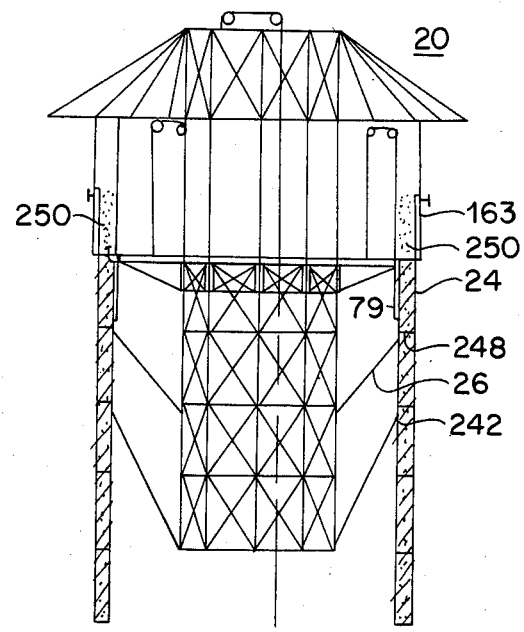

FIG. 30 shows derrick 20 being extended, raising outside forms 163 and maintaining the height of deck scaffold 62 and inside forms 79. Upper cables 26 go slack as the full load is taken on lower cables 28. As in FIG. 31, slack upper cables 26 are detached from stirrups 242 and reattached to stirrups 248 at the next higher level. Outside forms 163 are plumbed, leveled, and fixed in place. Steel 250 is set, and inside forms 79 are broken loose from wall 24.

Figure 32:
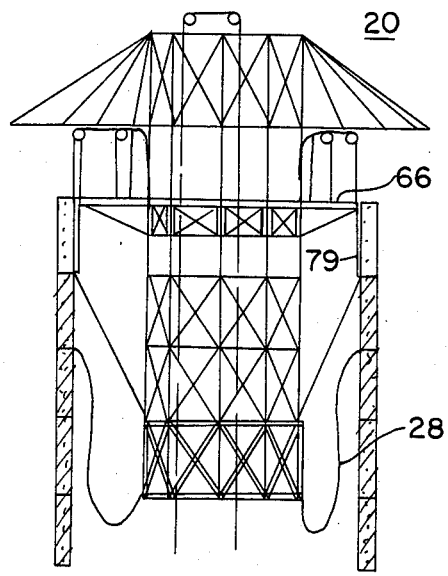
Figure 33:
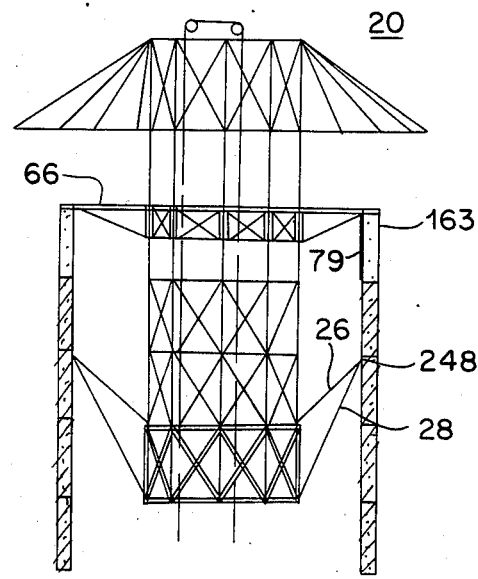

FIG. 32 shows derrick 20 being retracted, causing lower cables 28 go slack and raising deck 66 and inside forms 79. In FIG. 33, slack lower cables 28 are relocated to stirrups 248 at the next higher level. Concrete is poured from the deck 66 between forms 79 and 163. After this concrete has set (typically by the next day), the procedure is repeated from FIG. 28.

We claim:

1. A derrick for use in the construction of a tower, which derrick may be suspended from the tower by cable means, the derrick having:
   an upper part and a lower part, one of which may be vertically extended relative to the other to vary the vertical dimension of the derrick;
   pulley means for automatically maintaining an item which is suspended from the derrick at a constant elevation when the derrick is extended, and for raising the item when the derrick is retracted,
   said pulley means comprising:
   cable means attached to the item;
   at least one first pulley suspended from a relatively high point on the upper part of the derrick through which the cable means suspends the item from the derrick and through which the cable means is turned downwards;
   a post attached to a bottom of the upper part of the derrick and extending down past the bottom of the upper part and past a top of the lower part of the derrick;
   a second pulley on a lower part of the post which turns the cable means form the pulley toward the top of the lower part of the derrick; and
   an attachment point at the top of the lower part of the derrick to which the cable means is attached.

2. A derrick for use in the construction of a tower, which derrick may be suspended from the tower by cable means, the derrick having:
   at least two parts, one of which may be vertically extended relative to the other to vary the vertical dimension of the derrick; and
   pulley means for automatically maintaining a deck at a constant elevation relative to the tower when the derrick is extended, and for raising the deck when the derrick is retracted.

3. A derrick for use in the construction of a tower, which derrick may be suspended from the tower by cable means, the derrick having:
   at least two parts, one of which may be vertically extended relative to the other to vary the vertical dimension of the derrick; and
   pulley means for maintaining a deck and inside casting forms at a constant elevation relative to the tower when the derrick is extended, and for raising the deck and forms when the derrick is retracted.

4. A derrick according to claim 3 having as its two parts an upper part and a lower part in which the pulley means further comprises:
   cable means, connected at one end to;
   an attachment point on the lower part of the derrick;
   post means affixed to the upper part of the derrick;
   said post means having a bottom, the bottom of the post means being located below the attachment point of the cable means;
   a lower pulley means located on the bottom of the post means, around which lower pulley means the cable means turns; and
   an upper pulley means located relatively high on the upper part of the derrick around which upper pulley means the cable means turns to support therebelow one or more items which will remain at a constant elevation when the derrick is retracted.

5. A derrick for use in the construction of a tower, said derrick having:
   an upper part;
   a lower part, the upper part and the lower part being vertically extendable relative to each other;
   upper cable means capable of supporting the derrick from the upper part;
   lower cable means capable of supporting the derrick from the lower part;
   a plurality of separate hydraulic rams; and
   means for operating all of said rams at an equal rate of extension, regardless of any disparity of loading on each separate ram.

6. A scaffold for suspension from a derrick the derrick being for use in construction of a tower and suspendable from the tower by cable means,
   an upper inner framework;
   a lower inner framework;
   means for attaching wooden beams to the upper inner framework;
   wooden primary beams which radiate outward from the means for attaching;
   diagonal strut means between the means for attaching and the lower framework;
   deck means over said beams.

7. A scaffold according to claim 6 having:
   the upper inner framework comprising a polygon comprised of girders and joints;
   the lower inner framework similar to the upper inner framework;

the means for attaching radiating from the joints of the upper framework; and the diagonal strut means affixed to the joints of the lower framework.

8. A scaffold for suspension from a derrick, said scaffold comprising:

an upper inner framework including a polygon comprised of girders and joints;

a lower inner framework similar to the upper inner framework;

means for attaching wooden beams to the upper inner framework, the means for attaching radiating from the joints of the upper framework;

wooden primary beams which radiate outward from the means for attaching;

diagonal strut means between the means for attaching and the lower framework, the diagonal strut means affixed to the joints of the lower framework;

deck means over said beams;

endpieces at the circumferential end of the wooden primary beams, said endpieces comprising:

means for slidably mounting extensible support means; and means for detechably mounting a tensile member triangulating to the lower joint.

9. A scaffold according to claim 8 having an adjustable tensile member triangulating between the endpiece and the lower joint.

10. A scaffold according to claim 9 having:

carrier beams beneath and substantially transverse to at least some of the primary beams, said carrier beams having;

scaffold support means comprising attachment points.

11. A scaffold according to claim 10 having a plywood work deck.

12. A scaffold according to claim 11 having:

secondary beams radiating from the vicinity of the upper inner polygon between the primary beams;

the secondary beams secured to and supportable by the carrier beams;

joists which traverse a plurality of radial beams, the joists being located over and supported by the radial beams;

the plywood decking being located over and supported by the joists.

13. A scaffold according to claim 12 having aluminum verticals between the joints of the upper polygon and the joints of the lower polygon attaching said polygons to and spacing them from each other and having rods triangulating between the diagonally opposed joints of quadrangles formed by the girders and aluminum verticals.

14. An endpiece for a beam comprising:

a body having three closed sides -- two of which are opposed, one open side, and two open ends -- one end being conveniently referred to herein as a distal end and one end as a proximal end;

a pair of substantially horizontal flanges projecting from the opposed sides;

a cross member traversing the open side and secured at an adjustable distance to each flange;

loop means for attachment of a hook; and first pin means barring the open distal end of the housing.

15. An endpiece according to claim, 14 comprising mounting means for slidably mounting extensible support members.

16. An endpiece according to claim 15 having:

the open side defined herein to be oriented up;

the pair of substantially horizontal flanges projecting at upper proximal corners of the opposed sides;

the cross member comprising a box tube with two bolt holes therethrough, the cross member being bolted through each said hole to each of the horizontal flanges on opposite sides of the open side;

the loop means comprising a pair of straps, each located on a pin at a lower proximal corner of an outside of an opposed side and secured thereto by a clevis pin, and a spacer pipe bolted between the straps at their proximal ends;

the mounting means comprising four substantially vertical flanges, two projecting from the outside of each opposed side, each flange having openings through which extensible support members can be slidably mounted; and second pin means for immobilizing the extensible support members including:

a hole affixed to the body, a plurality of holes located on the extensible support members, and a pin insertable in two of such holes, when the holes are coincident, which pin when so inserted prevents relative movement between the extensible support members and the body.

17. A method of constructing a tower comprising the steps of:

extending by hydraulic rams a two part derrick having an upper and a lower part from a retracted condition to an extended condition while said derrick is supported by a plurality of lower cables connecting its lower part to the tower;

employing pulley means to automatically maintain an item at a constant height relative to the tower during the extension of the derrick;

disconnecting a plurality of upper cables which had connected the upper section of the derrick to the tower;

reconnecting the upper cables to a level of the tower higher than they had previously been connected to;

retracting the derrick to its retracted position while the pulley means raises the item to a new level;

disconnecting tower ends of the lower cables from the tower;

reconnecting said ends of the lower cables to a higher level of the tower.

18. A method of constructing a tower comprising the steps of:

breaking loose outside forms from a highest and most recently poured level of concrete wall of the tower;

extending by hydraulic rams a two part derrick having an upper part and a lower part from a retracted condition to an extended condition while said derrick is supported by a plurality of lower cables connecting its lower part to the tower and while the outside forms are supported from the upper part;

employing pulley means to automatically maintain a scaffold and inside forms at a constant height relative to the tower during the extension of the derrick;

disconnecting a plurality of upper cables which had connected the upper section of the derrick to the tower;

reconnecting the upper cables to a level of the tower higher than they had previously been connected to;

fixing the outside forms into place at a new level to which they have been raised;

placing reinforcing steel inside the outside forms;

breaking loose the inside forms;

retracting the derrick to its retracted position while the pulley means raises the scaffold and inside forms to new levels, the inside forms being raised to the new level even with the outside forms, said inside and outside forms having tops, the platform being raised to the tops of the forms;

disconnecting tower ends of the lower cables from the tower;

reconnecting the tower ends of the lower cables to a higher level of the tower;

fixing the inside forms in place;

pouring concrete between the inside and outside forms to cast a new level of tower;

waiting overnight for the concrete to set;

repeating the procedure.

19. A method of adjusting the size of a scaffold, said scaffold having plywood decking, joists, endpieces, primary beams, secondary beams, and beam ends on both primary and secondary beams, comprising the steps of:

cutting away an annulus of the plywood decking;

removing any of the joists uncovered thereby;

removing each endpiece from its primary beam end, cutting back the primary beam to create a new beam end, and replacing the endpiece on the primary beam's new end;

cutting back the secondary beams.

20. A method acccording to claim 19 in which the endpiece which includes a loop means is removed from its beam end by releasing tension from an adjustable tensile member and by then sliding the endpiece from the end, and is replaced after cutting back the beam by sliding the endpiece onto the new beam end and applying tension to the loop means on the endpiece by tightening the adjustable tensile member.

* * * * *

UNITED STATES PATENT AND TRADEMARK OFFICE
CERTIFICATE OF CORRECTION

PATENT NO. : 4,696,135          Page 1 of 2

DATED : September 29, 1987

INVENTOR(S) : Kallinger et al.

It is certified that error appears in the above-identified patent and that said Letters Patent is hereby corrected as shown below:

Col. 1, line 68: change "taughtly" to --tautly--.

Col. 4, line 4: change "suport" to --support--;

line 39: change "extened" to --extended--;

line 40: after "is" insert --a--;

line 50: change "an" to --a--;

line 51: change "a" to --an--; and line 61: change "FIG." to --FIGS.--

Col. 5, line 65: change "in" 1st occurrence to --of--

Col. 9, line 46: change "18" to --20--.

Col. 10, lines 2-3: delete "the next level where they are fixed in place", second occurrence.

UNITED STATES PATENT AND TRADEMARK OFFICE
CERTIFICATE OF CORRECTION

PATENT NO. : 4,696,135

DATED : September 29, 1987

INVENTOR(S) : Kallinger et al.

It is certified that error appears in the above-identified patent and that said Letters Patent is hereby corrected as shown below:

Col. 11, line 65: change "form" to --from--.

Col. 12, line 62: change "the lower" to --the lower--.

Col. 13, line 24: change "detechably" to --detachably--.

Signed and Sealed this

Nineteenth Day of April, 1988

Attest:

DONALD J. QUIGG

*Attesting Officer*  *Commissioner of Patents and Trademarks*